Feb. 19, 1946. E. PORTER 2,395,064
RIM STRUCTURE FOR WHEELS
Filed June 23, 1943 2 Sheets-Sheet 1
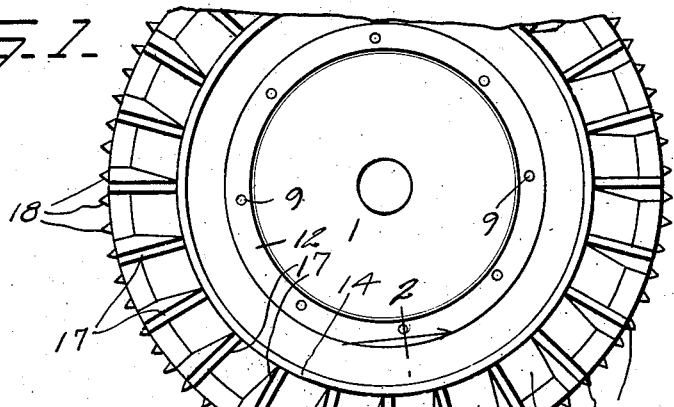
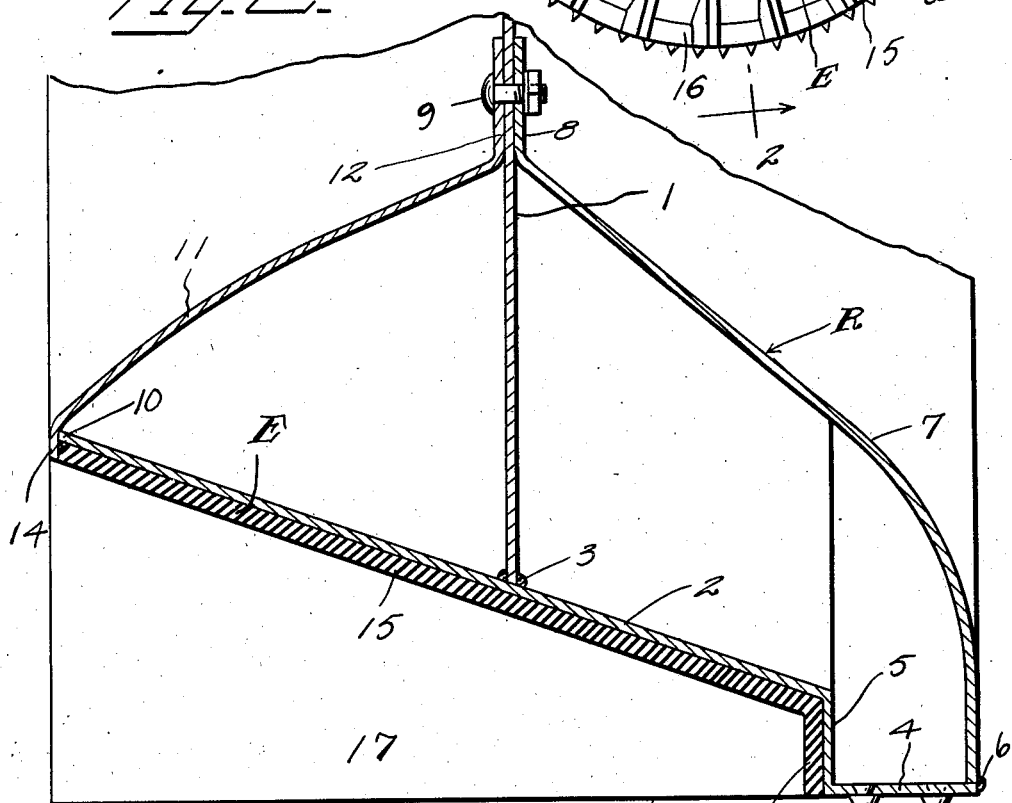
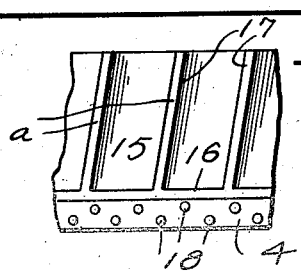
Inventor
Edward Porter

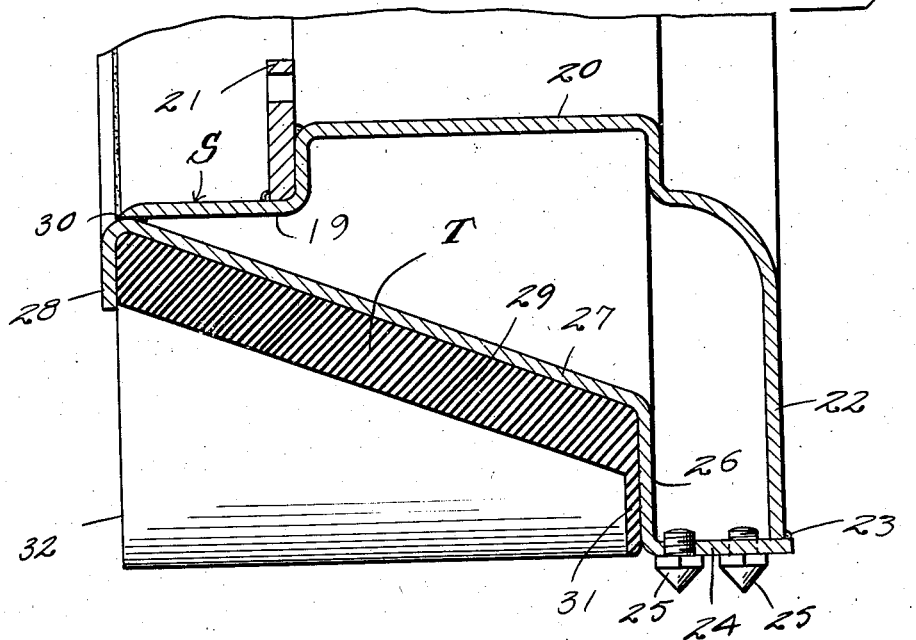
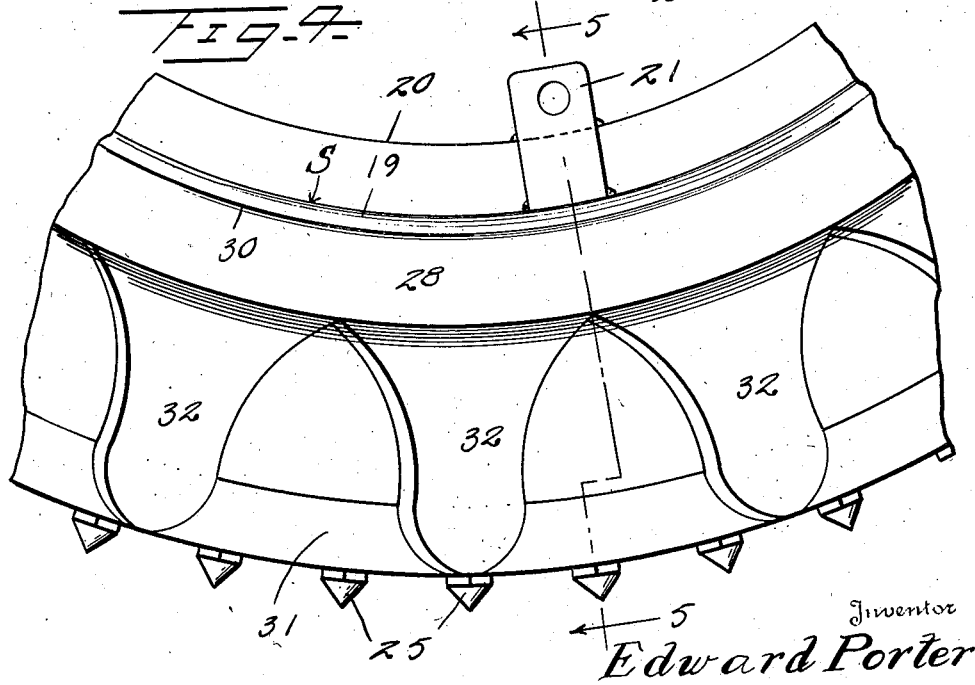

Patented Feb. 19, 1946

2,395,064

UNITED STATES PATENT OFFICE 2,395,064

RIM STRUCTURE FOR WHEELS

Edward Porter, Akron, Ohio, assignor of two-twentieths to Alvin W. Larson, Akron, Ohio Application June 23, 1943, Serial No. 491,981

3 Claims. (Cl. 301—43)

This invention relates to a rim structure for wheels, and it is primarily an object of the invention to provide a rim structure which will permit a high maximum of tractive action of the wheel with which the rim structure is associated when traversing a hard or soft surface.

It is also an object of the invention to provide a rim structure which is particularly designed and adapted for use in connection with heavy duty as encountered in traveling over snow, mire and ice but which can also traverse a hard surface, such as a finished roadway.

An additional object of the invention is to provide a rim structure constructed in a manner to assure maximum of pulling power when traversing snow, mire or the like and which also provides means to prevent undue sinking into such surface.

The invention consists in the details of construction and in the combination and arrangement of the several parts of my improved rim structure for wheels, whereby certain important advantages are attained, as will be hereinafter more fully set forth.

In order that my invention may be better understood, I will now proceed to describe the same with reference to the accompanying drawings, wherein:

Figure 1 is a view in side elevation, with a portion broken away, of a rim structure embodying my invention and wherein the rim is comprised with the wheel as a unit;

Figure 2 is an enlarged sectional view taken substantially on the line 2—2 of Figure 1;

Figure 3 is a fragmentary view in plan of the structure as comprised in Figures 1 and 2;

Figure 4 is a fragmentary view in side elevation of a rim structure in accordance with another embodiment of the invention; and Figure 5 is a sectional view taken substantially on the line 5—5 of Figure 4.

In the embodiment of the invention as illustrated in Figures 1 to 3 of the drawings, the rim structure is comprised as a unit with the wheel proper which is of a disk type. The disk 1 of the wheel proper is of desired dimensions and is constructed as preferred. As the particular formation of this disk 1 may be varied, it is only diagrammatically shown in the drawings as no claim is made to the detailed structure or formation of the disk.

The rim structure R as herein comprised includes an annular tread member 2 which is of considerable width and has its central portion welded, as at 3, or otherwise rigidly secured to the outer or peripheral portion of the disk 1. The tread member 2 is of metal and one marginal portion thereof is pressed downwardly or otherwise formed to provide a supplemental side tread member 4, the contacting surface of which is at all points transversely thereof substantially parallel to the axis of the tread member 2. This supplemental tread member 4 is integrally connected with the adjacent marginal portion of the tread member 2 by the interposed continuous annular wall 5 preferably substantially at right angles to the supplemental tread member 4.

The tread member 2 is disposed at all points in cross section away from the wall 5 on an inward incline on an angle of approximately 22½ degrees although, of course, the invention is not to be limited in this respect as such degree of angle will be as best determined by the requirements of practice.

When the wheel is in working or applied position, it is preferred that the supplemental tread member 4 be on the inside and for which reason such tread member 4 will be hereinafter referred to and claimed as being inside although, of course, it is to be understood that this is to include the reverse location of this supplemental tread member, if preferred.

Welded, as at 6, to the outer marginal portion of the supplemental tread member 4 is the outer marginal portion of a reinforcing plate 7 which is disposed inwardly toward the disk 1 on such curvature or angle as best deemed advisable and terminates at its inner marginal portion with a flange 8 having close contact with the inner side face of the disk 1 and anchored thereto by the suitably positioned holding bolts 9 which can be of any number desired. It is to be stated, however, that this connection may be otherwise accomplished as it is only necessary that there be a rigid and secure attachment.

Welded, as at 10, to the outer marginal portion of the tread member 2 is the outer marginal portion of a second strengthening or reinforcing plate 11 which extends inwardly on a desired angle toward the disk 1 and terminates in the flange 12 contacting with the disk 1 and securely and rigidly held thereto by the bolts 9 or otherwise as may be preferred.

As is clearly illustrated in Figure 2, the outer marginal portion of the plate 11 extends outwardly, as at 14, beyond the adjacent edge of the tread member 2, whereby is provided a holding stop for maintaining the non-slipping element E in place. This element E may be made of any material desired but preferably of a heavy rubber compound possessing requisite resisting qualities.

This element E includes a continuous base member 15 which, when applied, has close contact with the outer face of the tread member 2 and is provided at its inner margin with the outwardly disposed continuous flange 16 for close contact with the outer face of the wall 5. This base member 15 and its flange 16 are vulcanized in a well known manner to the tread member and the wall 5 to assure maintenance of the same in desired position. If desired, of course, other means may be used for effecting this secure anchorage.

Formed as an integral part with the base member 15 and its flange 16 are the circumferentially and equidistantly spaced traction flanges 17 which extend substantially entirely across the tread member 2 and on a predetermined angle, with adjacent flanges 17 normally substantially parallel. As is clearly illustrated in the accompanying drawings, the outer margin a of each of the traction flanges 17 is substantially flush or coplanar with the outer or contacting face of the supplemental tread member 4.

The flanges 17 are also preferably made of a rubber compound of requisite strength although other material may be employed, but it is highly essential that the material be such as to permit each of the flanges 17 to have a certain degree of inherent resiliency so that in use the packing of snow, ice or other foreign material thereon is eliminated. In the use of a rubber compound, it has also been found that the liability of ice forming on the lug 17 is also substantially eliminated.

The supplemental tread member 4 has secured thereto in any manner desired the conventional traction lugs 18 although when desired or deemed expedient they can be dispensed with.

It is believed to be obvious from the foregoing that a rim structure as hereinbefore set forth is one which assures a wheel traveling over ice, mire, sand and snow with full pulling power and with a minimum of sinking and it is also believed to be equally apparent that the supplemental tread member 4 allows the desired travel over a hard surface.

In the embodiment of the invention as illustrated in Figures 4 and 5, the rim structure is of a separate type which is adapted to be applied to the usual type of wheels now employed in connection with heavy vehicles. In this form of the invention, the rim structure S comprises the annular base member 19 of considerable width and which is provided with the intermediate inwardly offset portion 20 to have direct contact with the periphery of the wheel to which it is applied and said portion 20 at one side thereof is provided with the lugs 21 placed as desired for coaction with the usual holding bolts to maintain the rim structure in applied position.

One marginal portion, to be referred to as the inside marginal portion, is continued to provide an outstanding marginal flange 22, the outer edge portion of which is welded or otherwise rigidly secured, as at 23, to the outer marginal portion of a flat supplemental tread member 24. This supplemental tread member 24 may have applied thereto the conventional traction lugs 25.

The inner margin of this supplemental tread member 24 is continued by an upstanding wall 26 substantially at right angles thereto and the inner end of this wall 26 is continued by the outwardly disposed and inwardly inclined tread member 27 of considerable width. The outer or free end of this tread member 27 terminates in a depending holding flange 28 for coaction with the base member 29 of the traction element T. The outer marginal portion of the base member 19 is welded, as at 30, or otherwise rigidly secured to the outer marginal portion of the tread member 27.

The base member 29 of the traction element T is also preferably of a rubber compound of requisite tenacity and includes at its inner margin the flange 31 having close contact with the wall 26. The base member 29 is preferably vulcanized to the tread member 27 and the flange 31 to the wall 26 although, of course, other means of secure attachment can be employed.

Formed with the base member 29 and the flange 31 are the traction flanges 32 for the same purpose as the flanges 17 referred to in the first embodiment of the invention but in this present form these flanges 32 are comparatively thick and heavy.

From the foregoing description it is thought to be obvious that a rim structure for wheels constructed in accordance with my invention is particularly well adapted for use by reason of the convenience and facility with which it may be assembled and operated.

It is also to be pointed out that the wall 5 or 26 and also the outer marginal portion of the plate 7 or 22 provide effective means to prevent side skidding and particularly when the structure is traveling through snow, mire and other soft or yieldable surfaces.

What is claimed is:

1. A rim structure for wheels, comprising a relatively wide main tread member disposed transversely on an inward incline with respect to the axis of the structure, a side marginal portion of the tread member being radially outwardly extended to form a radial wall and then axially extended to provide a supplemental tread member, the tread face of the supplemental tread member being substantially parallel with the rotary axis of the rim structure, and traction flanges extending radially outwardly from the main tread member across and joined to said radial wall, the traction flanges forming webs between the first tread member and the wall and being substantially flush at their radial edges with the traction face of the supplemental tread, a radial marginal wall joined to the edge of the main tread member opposite from and in spaced parallel relation with said radial wall, and a nonslipping composition covering the outer surface of the tread member and maintained between said radial walls.

2. A rim structure, comprising a circular body designed to be mounted on a wheel axle and comprising a central portion and inner and outer side portions, each of said side portions merging into a radially outwardly extending flange, one of said flanges being of greater width than the other whereby the periphery of the flange of greater width is of greater circumference than the said other flange, a radial wall in spaced relation with and of equal diameter to, the said flange of greater width, a tread joined to and extending at an angle from the said radial wall radially inwardly from the outer periphery thereof at an inclination toward and joined to the said other flange, an auxiliary tread connecting the peripheries of the flange of greater width and the radial wall, and cleats upon the radial outer side of the tread and extending from said radial wall to the side of the rim remote therefrom.

3. A wheel rim structure, comprising a relatively wide main tread member disposed transversely on an inward incline with respect to the axis of the structure, a side marginal portion of the tread member being radially outwardly extended to form a radial wall and then axially extended to provide a supplemental tread member of a width materially less than the width of the main tread member, the said supplemental tread member bordering one side of the wheel rim structure and the tread face of the supplemental tread member being substantially parallel with the rotary axis of the wheel rim, a radial marginal wall joined to the edge of the main tread member opposite from said radial wall, and traction flange cleats extending radially outwardly from the main tread member between said radial marginal wall and said radial wall and having their radial edges in the plane of the tread face of the supplemental tread member.

EDWARD PORTER.